US009464746B2

(12) United States Patent
Aloisio

(10) Patent No.: US 9,464,746 B2
(45) Date of Patent: Oct. 11, 2016

(54) TAPPED NO-HUB COUPLING

(71) Applicant: Benjamin Aloisio, Puyallup, WA (US)

(72) Inventor: Benjamin Aloisio, Puyallup, WA (US)

( * ) Notice: Subject to any disclaimer, the term of this patent is extended or adjusted under 35 U.S.C. 154(b) by 451 days.

(21) Appl. No.: 14/082,139

(22) Filed: Nov. 16, 2013

(65) Prior Publication Data

US 2014/0138943 A1 May 22, 2014

Related U.S. Application Data

(60) Provisional application No. 61/729,167, filed on Nov. 21, 2012.

(51) Int. Cl.

*F16L 21/02* (2006.01)
*F16L 41/14* (2006.01)
*E03C 1/284* (2006.01)
*E03C 1/294* (2006.01)

(52) U.S. Cl.

CPC ................ *F16L 41/14* (2013.01); *E03C 1/284* (2013.01); *E03C 1/294* (2013.01); *Y10T 137/0447* (2015.04)

(58) Field of Classification Search

CPC ........ F16L 41/14; E03C 1/284; E03C 1/294; Y10T 137/0447
USPC .......................................................... 285/369
See application file for complete search history.

(56) References Cited

U.S. PATENT DOCUMENTS 2,900,200 A * 8/1959 Umstadter .......... F16L 19/0212 285/332.3
3,402,946 A * 9/1968 Dedian ................. F16L 21/005 285/236
3,559,694 A * 2/1971 Volberg .................. F16L 59/16 138/147
3,633,219 A * 1/1972 Byrd ......................... E03F 1/00 137/363
3,682,503 A * 8/1972 Bloom .................. F16L 21/005 285/345

(Continued)

*Primary Examiner* — Basil Katcheves
*Assistant Examiner* — Joshua Ihezie
(74) *Attorney, Agent, or Firm* — Kal Lambert; Lambert Patent Services, LLC

(57) ABSTRACT

A “tee” coupling for use with a no-hub cast iron “P-trap”; the tee is directionally rotatable on the a step engaging the standpipe end of the trap. Two interchangeable gasketed ends are provided for securing the coupling in line with the trap. A rigid band for reinforcing the tee fitting is embedded in the walls of the coupling between the two gasketed ends and the coupling is reinforced with an external metal sheath. Paired pipe clamps on each end of the coupling are tightened around the sheath to seal the gaskets to the pipe ends after the “tee” is “aimed” in the desired direction for laying the primer line.

20 Claims, 7 Drawing Sheets

(56) References Cited

U.S. PATENT DOCUMENTS 3,837,683 A * 9/1974 Taylor .................. F16L 21/005 285/236
3,904,228 A * 9/1975 Maroschak ............ F16L 5/022 285/129.1
3,933,377 A * 1/1976 Arrowood ............ F16L 21/005 248/62
3,960,181 A * 6/1976 Baur ...................... F16L 59/11 138/110
3,982,723 A * 9/1976 Ford ........................ F16K 7/07 251/5
4,162,546 A * 7/1979 Shortell ................ D06F 39/083 137/602
4,218,786 A * 8/1980 Taglarino ................. E03C 1/24 137/247.25
4,246,664 A 1/1981 Reynolds
4,518,177 A * 5/1985 Deakins .................... F16L 3/11 248/62
4,538,837 A * 9/1985 Cronk .................. F16L 21/005 285/148.11
4,538,839 A * 9/1985 Ledgerwood ......... F16L 21/005 285/236
4,810,008 A * 3/1989 Brodie ................ F16L 55/1608 285/133.4
4,915,422 A * 4/1990 Chacon .................. B25B 27/10 277/615
5,054,513 A * 10/1991 Trueb ...................... E03C 1/041 137/247.51
5,390,960 A * 2/1995 Blake ........................ E03F 3/04 239/204
5,431,458 A * 7/1995 Schaub .................. F16L 25/14 285/236
5,893,588 A * 4/1999 Esser .................... F16L 23/024 285/16
5,901,731 A * 5/1999 Traylor ..................... E03C 1/12 137/15.09
6,145,895 A * 11/2000 Patel ..................... F16L 21/005 285/222.3
6,408,887 B2 6/2002 Rahimzadeh
6,795,987 B2 9/2004 Cornwall
6,859,956 B2 3/2005 Mantyla
7,254,901 B2 * 8/2007 Blann ..................... E03C 1/184 34/595
7,290,557 B1 * 11/2007 Bowman ................... E03C 1/12 137/216
7,770,941 B2 8/2010 Ward
7,909,370 B1 * 3/2011 Wilsey .................. F16L 21/005 285/235
7,964,095 B1 6/2011 Graybeal
8,256,800 B2 9/2012 Ward
8,448,995 B2 5/2013 Ward
2001/0035223 A1 11/2001 Rahimzadeh
2002/0189675 A1 12/2002 Huber
2005/0155659 A1 7/2005 Rahimzadeh
2008/0184783 A1 * 8/2008 Chromey ................ G01M 3/02 73/49.5
2009/0261576 A1 10/2009 Ward
2009/0261585 A1 10/2009 Ward
2010/0244437 A1 * 9/2010 O'Neil .................... F16L 43/02 285/104
2013/0048087 A1 * 2/2013 Sato ........................ E03B 1/044 137/1
2013/0160203 A1 * 6/2013 DeGooyer ............ E03F 5/0408 4/679

* cited by examiner 10
11
12
13
15
COUPLING
ROTATES
ON LONG AXIS
16
17
TO
SEWER
LINE
18
18a

12

TAPPED NO-HUB COUPLING

CROSS REFERENCE TO RELATED APPLICATIONS

This application is related to and claims priority to U.S. Provisional Patent No. 61/729,167 entitled "Tapped No-Hub Coupling", as filed Nov. 21, 2012, which is herein incorporated in full by reference for all purposes.

GOVERNMENT SUPPORT

Not Applicable.

FIELD OF THE INVENTION

This invention is related to a tapped no-hub plumbing fitting for rotatably coupling a primer line through a tee to a cast iron P-trap assembly of a drainage system and to methods for using such fittings in construction.

BACKGROUND

Tapped "P-traps" are an important safety feature in modern plumbing, and find their use for sewer, drain, and waste connections such as in floor drains, floor sinks and in commercial indoor fire sprinkler systems. Where a drain is connected to a sewer line, a tapped P-trap is used to ensure that sewer gas does not enter the building. Because the Uniform Plumbing Code (UPC) requires that all traps be primed, water must be supplied to the P-trap to keep the trap filled with water. The trap depends on being full of water to fulfill its function, and will not serve as a barrier to sewer gas if it goes dry.

In best practice, a "primer line" is joined to the trap at a tee and configured so that water flows into the trap at a slow drip, ensuring that the trap remains full. Access plates are arranged to permit maintenance access to a bleed valve that adjusts water flow into the trap, but the trap itself is frequently below slab and not accessible.

Typically, in a floor drain for example, a ½" copper line is run through a series of solder joints to the "P-trap" and joins the cast iron at an adaptor which is provided with a ferrule to make a compression seal around the copper primer line. The layout of the primer line is typically more complex than wanted because conventional P-trap adaptors are in a fixed position on the trap pipe segment, so that the primer line must be brought to the adaptor rather than bringing the adaptor to the primer line. Plumbing is laid before the slab is poured, and best practice is to minimize turns in the piping and to avoid soft copper turns entirely because workers can kick, trip over or kink the plumbing lines when laying rebar or preparing the foundation, leading to slab leaks and other construction defects which are difficult and expensive to repair and result in potential liability that the plumber must insure against.

Wet "P-traps" also find use with floor sinks used in food preparation. The floor sink provides an air gap between a counter sink and the floor drain so that bacteria from the waste line cannot enter the sink if water backs up in the floor drain. Larger dish washers and sprinkler line pressure relief systems also use wet P-traps. A trickle of water, usually one drop every 10-20 sec, is used to continuously "prime" the trap so that gas remains confined underground. Thus there is a significant market for P-traps and associated fittings.

In commercial buildings, plumbing systems are typically assembled with cast iron pipe. Cast iron pipe is designed to be assembled by inserting a "spigot end" of a first pipe into a "hub end" of a second pipe and caulking to suppress leaks. Cast iron is not readily drilled out to accept a "tee" adaptor for admitting a primer line, and code does not permit use of the commonly available "BAP adaptors" when running cast iron line because of the difficulty in making proper seals to cast iron (BAP adaptors are intended to be glued in place). Gasketed "no-hub bands" are typically used to join cast iron pipe sections when making special connections. Tempting as it may be to simply join a plastic "tee" adaptor between caste iron stub ends using a band, this again poses the risk of damage during work on the foundation because any weight on the pipes is transferred to the weaker plastic adaptor, which can crack or deform at the joint. A "band" is the commonly used term for a gasketed sleeve, and is typically tightened in place using pipe clamps (sometimes termed "ring clamps") provided with the sleeve. Bands are typically close-fitting and are supported by an external metal sheath or "shroud" seated under the pipe clamps so as to resist any unwanted motion of the pipes. However, bands do not permit the plumber to introduce a "tee" for making a connection to a primer line; the soft gasket would not support one.

Thus, there is a need in the art, for a plumbing coupling configured to permit joining of a primer line to a cast iron "P-trap" through a coupling tee, where the coupling overcomes the above disadvantages and weaknesses.

SUMMARY

This invention is related to a tapped no-hub plumbing fitting for coupling a primer line through a tee in the coupling to a P-trap assembly. In a preferred embodiment, the invention relates to a system for joining a stub-ended P-trap to a standpipe with a coupling, the coupling having a tee adaptor for attaching a primer line and improvements thereto.

The tapped no-hub coupling includes a straight pipe union with center channel and center axis having a first end and a second end, where the pipe union is lined with a gasket sleeve liner extending from the first end to the second end. A rigid band is embedded in the gasket at the midpoint on the long axis of the center channel, the rigid band extending circumferentially around the internal diameter of the pipe union. A hole is defined in the rigid band for receiving a tee adaptor; the hole extends through the gasket. An external metal sheath wraps around the gasket and forms a sleeve extending from the first end to the second end of the pipe union. At least two pipe clamps, one at each end, are mounted circumferentially around the external metal sheath and are used to tighten the gasket in place after the fitting is installed. The pipe union is configured to join two no-hub cast iron pipe sections and may be rotated on the pipe sections to freely orient the tee adaptor in any direction on its axis of rotation.

Advantageously, the thickness of the rigid band, which for example may be a tubular steel band or ring, may be used to form protruding inside lips or "steps" in the center channel. These steps engage and support the pipes at their butt ends, so that when the coupling is tightened in place, a rigid mechanical stack is formed that resists manhandling such as when doing cement work with the plumbing in place, and reduces resulting construction defects. These steps aid in rotating the coupling to aim the tap hole in the desired direction for installing the primer line.

As a surprising advantage, the elevation of the tap can also be varied as required using this system. Sections of pipe are added to the drain line and "bands" are used to seal the sections in place. The tapped coupling is then inserted at the desired height. This insures that the primer line is placed at the proper level relative to the water supply and drain.

Because cast iron P-traps may be purchased without need for an installed t-adaptor, the cost of the improved coupling is substantially recovered in the reduced cost of the P-trap hardware.

Alternatively, in other embodiments, the pipe coupling of the invention may include a laterally extending pipe stub which is disposed so as to be fluidly joined to a primer line, thereby eliminating the need for a separate tee adaptor and increasing the rigidity and strength of the tee union. Less sturdy tee fittings may be inadvertently bent or broken during construction. In these embodiments, the pipe stub is built into the rigid band embedded in the gasket layer, such as by welding, machining, casting, or metal working skills known in the art, for example.

Also disclosed are methods for installing the improved tapped P-trap no-hub coupling system. The inventive methods include acts for fitting the coupling over a first end of a P-trap pipe section and a mated end of a standpipe pipe section to be joined. The pipe ends are fitted to engage internal steps protruding into the center channel of the coupling. These "step lips" correspond to the thickness of the rigid band supporting the tee fittings and function to improve the seal between the pipe ends and to permit rotation of the coupling on the centerline axis of the pipe junction. It is particularly advantageous that the coupling may then be rotated on the centerline axis so as to aim the tap hole in a preferred direction when laying out the primer line, thus reducing the length of the primer line, and the number of bends, couplings and solder joints required to complete installation. The coupling is then tightened to the pipe section ends using external ring clamps so that each end is rigidly supported on the internal steps. Once the primer line is connected, water flow is adjusted so that the P-trap remains full, an important safety requirement in building construction.

The foregoing and other elements, features and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps and combinations thereof that characterize aspects the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which.

Figure 1:
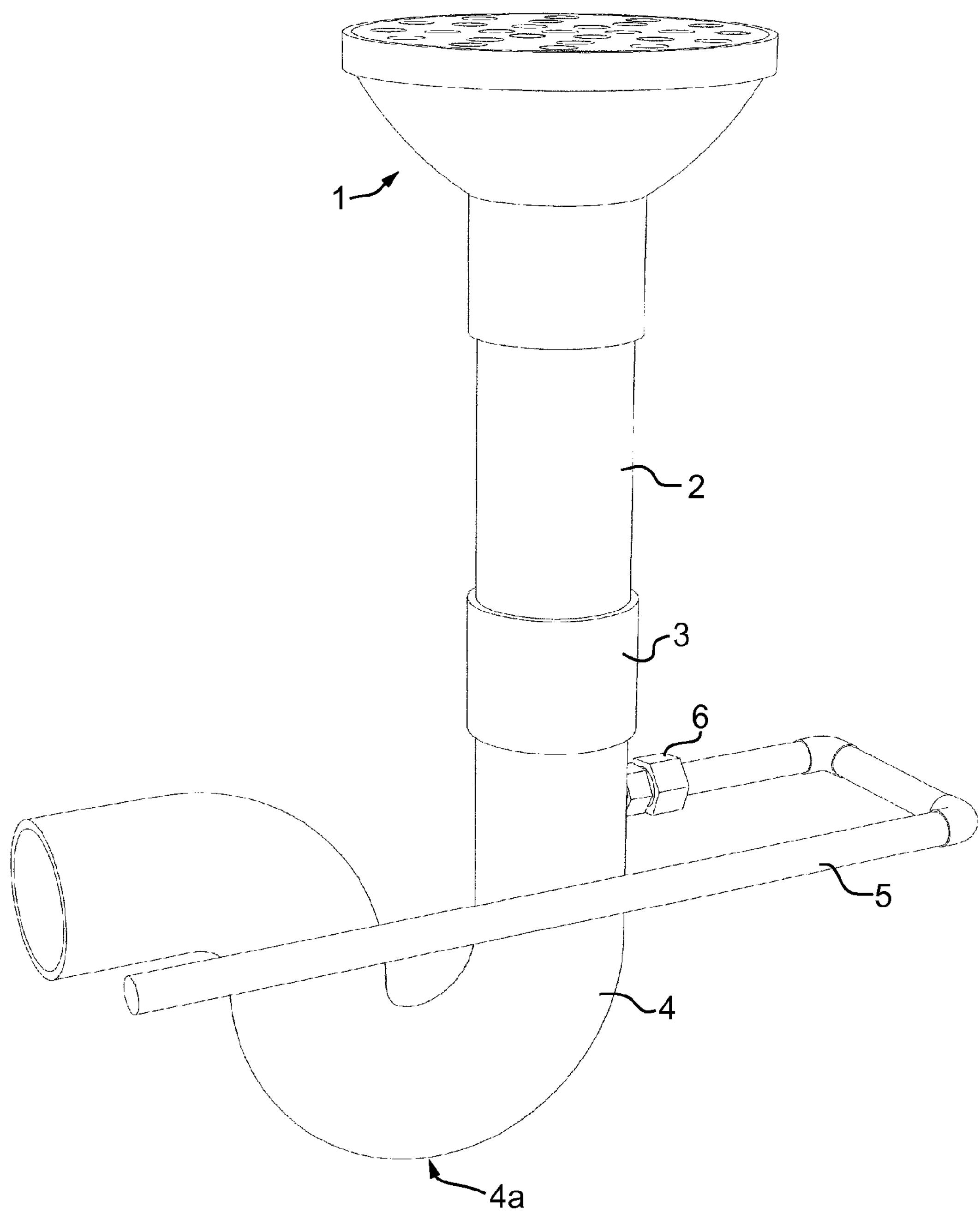
FIG. 1 is a perspective view of an installed floor drain, where the P-trap and primer line installation as shown is typical of the prior art.

The drawing figures are not necessarily to scale. Certain features or components herein may be shown in somewhat schematic form and some details of conventional elements may not be shown in the interest of clarity and conciseness. The drawing figures are hereby made part of the specification, written description and teachings disclosed herein.

NOTATION AND NOMENCLATURE

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

A "band" is a term of art, referring to a generally cylindrical coupling most commonly made of an elastomeric material, and is used to join sections of no-hub pipe.

A "hub" refers to a flared enclosing lip on a first end of a section of pipe, generally the "hub end", for receiving a first end, generally the "spigot end", of a second section of pipe. Hubs may be caulked with a sealing material if desired.

A "P-trap" refers to a generally "U" shaped curve in a pipe that is oriented so that water collects in the low end of the trap and prevents the ingress of gas up through the "U" while permitting the egress of water flowing down the pipe.

General connection terms including, but not limited to "connected," "attached," and "affixed" are not meant to be limiting and structures so "associated" may have other ways of being associated. "Fluidly connected" indicates a connection for conveying a fluid therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth.

Unless specifically stated otherwise, the terms "first," "second," "third," and "fourth" are meant solely for purposes of designation and not for order or limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Conventional"—refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—that is as "including, but not limited to."

The appended claims are not to be interpreted as including means-plus-function limitations, unless such a limitation is explicitly recited in a given claim using the phrase "means for."

"Conventional"—refers to a term or method designating that which is known and commonly understood in the technology to which this invention relates.

DETAILED DESCRIPTION

Referring to FIG. 1, a conventionally installed floor drain with cast iron P-trap is shown as an illustration of the prior art. In this view the floor drain 1 connects with a vertical standpipe 2, which is joined with a band 3 to a P-trap pipe section 4, which in turn connects downstream with a sewer main. As is well known, the "U-shaped" elbow 4*a* must be filled with water to function as a barrier to gas rising from the sewer line. To supply water to the trap 4*a*, water is introduced at a slow drip via a primer line 5 through a series of solder joints and enters the P-trap at a tee-adaptor 6 mounted in the cast iron wall of the trap. Problematically, the prior art tee-adaptor cannot be reoriented relative to the elbow 4*a* so as to be directed toward the water supply hookup of the primer line and cannot be moved up or down relative to the standpipe so as to avoid the need for extra turns in the primer line or to bring it up to the required level for connection to the cold water feed. Added time and material is required to route a conventional primer line because the tee-adaptor 6 cannot be repositioned, either by rotation or by raising or lowering the adaptor on the trap. And because the primer line 5 is easily damaged during work on the foundation, the current art often results in leaks under the slab which are difficult to locate and repair—any extra turns and runs of the primer line are a liability for both the plumber and the building owner.

Figure 2:
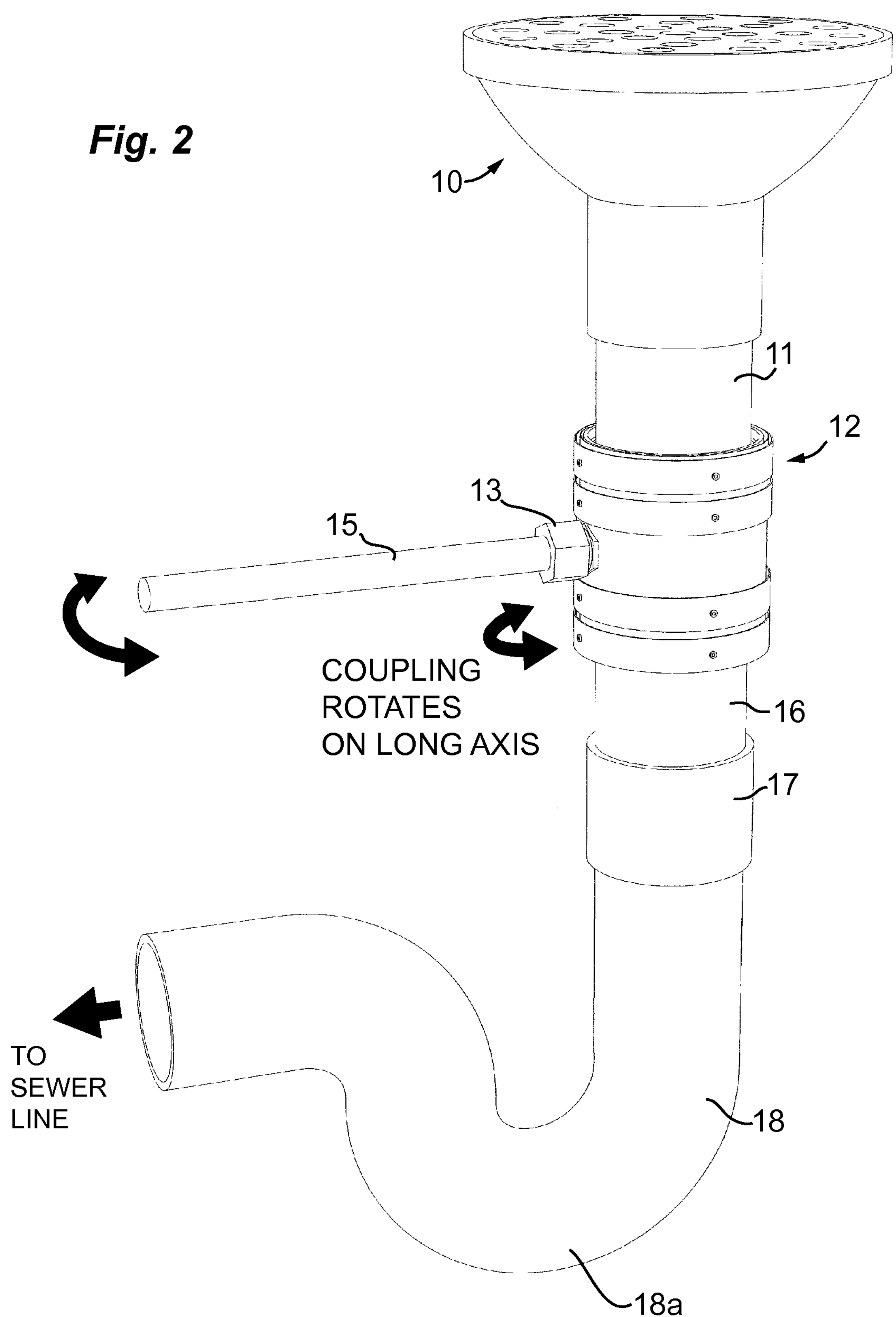
FIG. 2 is a perspective view of an installed floor drain, illustrating installation of a trap and simplified primer line using a no-hub coupling of the invention.

FIG. 2 demonstrates an example of an inventive solution to the problem of joining the primer line to a P-trap with maximal flexibility, simplicity and economy. In this example, which illustrates a floor drain sewer hookup analogous to that shown in FIG. 1, the floor drain 10 is connected to a standpipe 11, and the standpipe is fitted with a tapped no-hub coupling 12 of the invention, which includes in this embodiment a tee adaptor fitting 13 for receiving and fluidly connecting to the primer line 15. The second end of the coupling 12 is fitted over an extension pipe segment 16, which is joined by a band 17 to a P-trap segment (shown here without an integral tee coupling such as seen for comparison FIG. 1). Conventional P-trap pipe hardware may be used if necessary by capping the tee-stub. The height of the primer line can be adjusted by selecting the needed length of standpipe 11 and/or extending the pipe below the coupling if necessary to make the connection to the upper lip of the P-trap. In some instances extension 16 and band 17 are not necessary. Because, no tee adaptor is needed on the cast iron P-trap, a less expensive trap may be used.

Advantageously, before tightening the gasket seals of the inventive coupling 12, the tap hole and tee fitting 13 may be freely rotated on the long axis of the pipe so as to be "aimed" in the desired direction (double arrows) so that a straight run can be laid for the primer line. This minimizes exposure to damage during construction and results in a more simple and economical pipe layout. Surprisingly, both the direction of the primer line and its height can be adjusted using only a single fitting to replace multiple fittings of the prior art.

Figure 3:
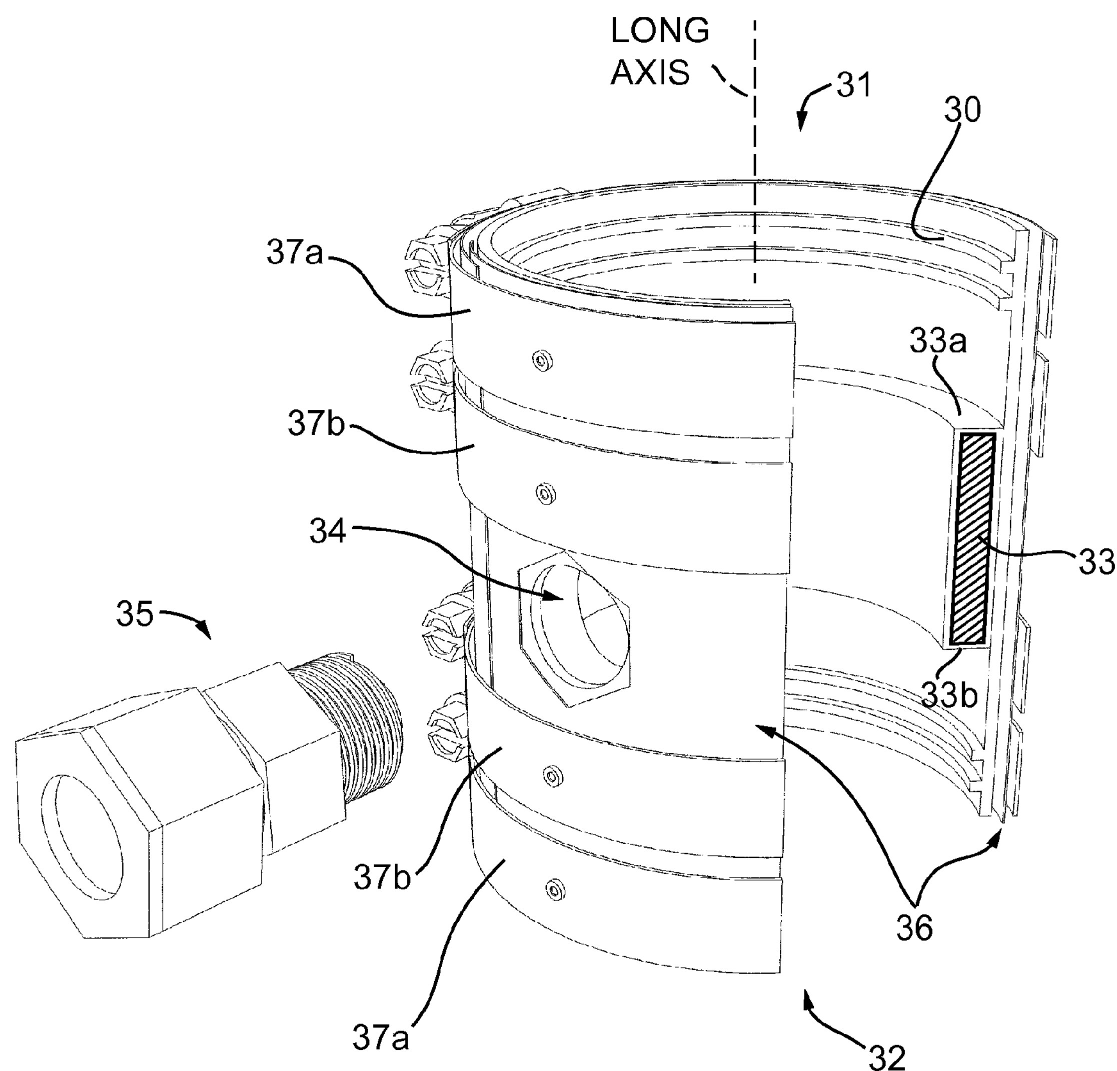
FIG. 3 is a cutaway view of a tapped no-hub coupling for joining a primer line though a "tee" adaptor fitting to a P-trap.

FIG. 3 illustrates the inventive coupling 12 in more detail. In cutaway view, a tapped no-hub straight pipe union is shown to include an internal gasket sleeve and liner 30 made of a compliant or elastomeric molded material such as a silicon rubber. Two gasketed ends (31, 32) are provided for positioning the coupling in line with the sewer line. A center channel with long centerline axis extends the length of the coupling 12. A rigid band (33, shown here in section) is shown inside the walls of the coupling between the two gasketed ends. The rigid band is generally made of a metal and extends circumferentially around the internal diameter of the pipe union. The rigid band is preferably embedded in or fitted outside the gasket so that it is not contacted with water in the pipe. A tap receiving hole 34 is defined in the rigid band 33, where the hole extends through the gasket material and external sheath 36 and is configured for receiving a tee adaptor fitting 35, shown here optionally as a threaded fastener having a compression nut, while not limited thereto. Optionally the hole is lined with gasket material, or the adaptor fitting may include a polymeric washer and/or bushing for lining the hole. The pipe coupling is strengthened to reinforce the pliant gasket liner with an external sheath 36 such as generally formed of sheet metal. The sheath is wrapped around the coupling during manufacture. The sheath forms an open sleeve extending from the first end to the second end of the pipe union and reinforces the structure to resist lateral stresses on the joint. At least one pipe clamp (37*a*, 38*a*), and preferably two paired ring clamps (37*a*, 37*b*, 38*a*, 38*b*) are disposed on each end of the coupling and are enabled to be tightened around the sheath so as to seal the gasket ends 31, 32 to the pipe ends. The tightening act is performed after the "tee" 35 is has been rotated and positioned in the desired orientation, a significant advance in the art realized by placing the tee adaptor fitting on the cylindrical body of the coupling and stabilizing the coupling between the two butt ends of the pipe joint by providing step lips 33*a* and 33*b*.

The tapped no-hub pipe union of the invention is configured to join two no-hub cast iron pipe sections and to be rotated on the pipe sections so as to point the tee adaptor fitting freely at any angle around its axis of rotation, generally in the direction of the cold water supply. The primer line is then run and secured to the tee-adaptor. Water dripping through the primer line enters the trap by natural drainage. In this way a tight and sturdy tee is formed that is rust resistant and can be rotated in the direction of the water supply to minimize the need for bends and turns in the primer line. By use of standpipe extensions as required, the "tee" to the primer line can be raised or lowered relative to the trap, as is sometimes required to prevent an annoying dripping sound if the tee is too high on the standpipe.

Synergically, the rigid band 33 projects into the internal diameter of the central channel and forms internal steps 33*a* and 33*b* on which the pipe ends are seated during the installation process, thus contributing to the overall mechanical rigidity of the finished joint after the pipe clamps are tightened. The steps generally conform to the wall thickness of the pipe, creating a smooth internal channel when assembly is complete. The tap hole 34 in the rigid band may include internal threads for receiving the tee adaptor or may be formed of a material that is self-threading in use. Alternatively, a smooth bore may be used to glue or braze a smooth bodied tee adaptor in place, or an internal gasket and retaining nut may be used. In another embodiment, a laterally extending pipe stub may be built into the rigid band and contains the tap hole. The pipe stub then serves as a point of attachment for an adaptor used to fluidly conjoin the primer line to the trap.

The external sheath may be formed with a decorative textured or colored design and may be silvered or bronzed if desired, and the internal gasket may be formed of a colored material, such as a red, green or violet rubber, so as to be readily branded by its unique appearance.

Figure 4:
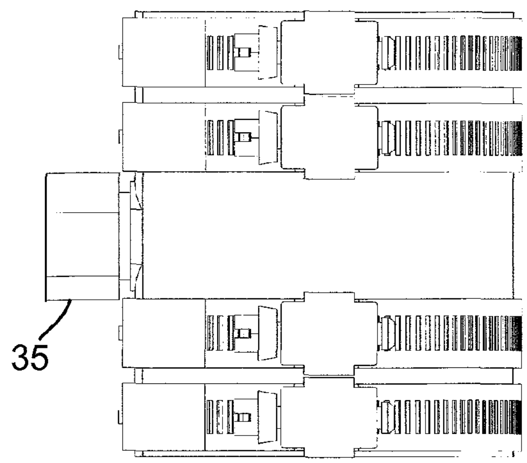
FIG. 4 is an elevation view of first face of a tapped no-hub coupling with tee.

FIG. 4 is an elevation view of first face of a tapped no-hub coupling 12 with tee fitting 35.

Figure 5:
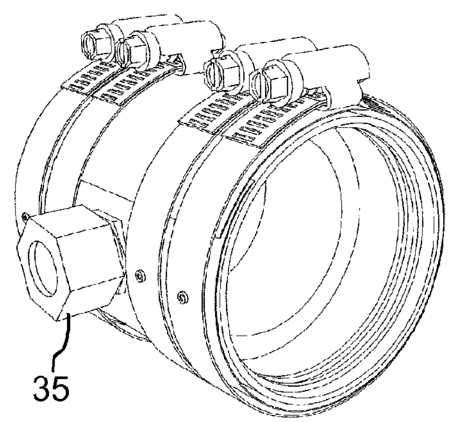
FIG. 5 is a perspective view of a tapped no-hub coupling with tee.

FIG. 5 is a perspective view of a tapped no-hub coupling 12 with tee fitting 35 and circumferential pipe clamps. Pairs of pipe clamps above and below the tee, and internal ribs in the soft gasket are used to ensure a fully sealed connection.

Figure 6:
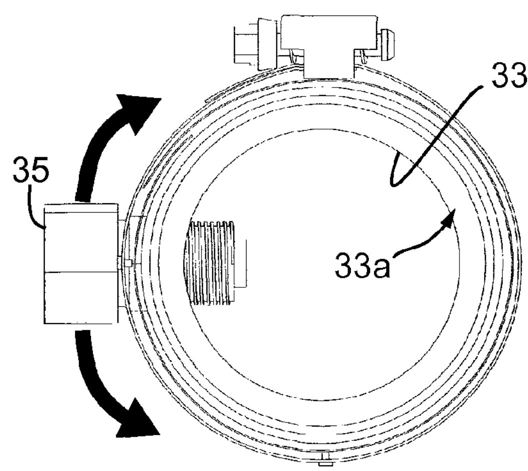
FIG. 6 is an end view of a tapped no-hub coupling with tee.

FIG. 6 is an end view of a tapped no-hub coupling 12 with tee fitting 35. In this instance, the tee adaptor 35 is threaded through the rigid band 33 embedded in the coupling gasket. Dark arrows indicate the capability of the coupling to be rotated on the long center axis. Advantageously, the pipe sections inserted into the coupling are able to slide on steps 33*a* of the rigid band during rotational alignment of the coupling and primer line.

Figure 7:
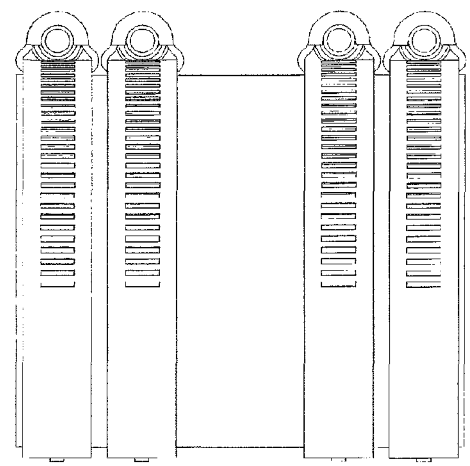
FIG. 7 is an elevation view of a second face of a tapped no-hub coupling.

FIG. 7 is an elevation view of a second face of a tapped no-hub coupling 12 with circumferential ring clamps.

Figure 8:
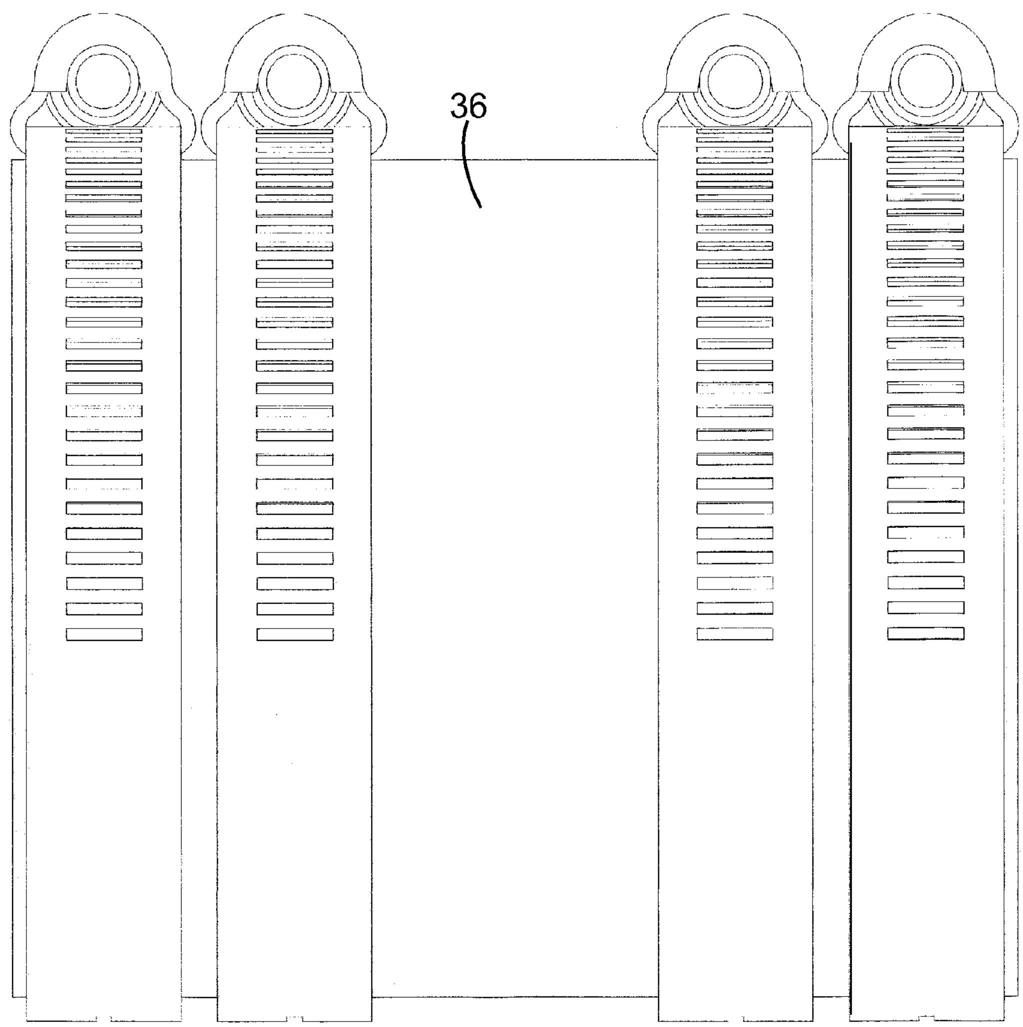
FIG. 8 is modified elevation view that breaks out optional rivets of a first embodiment of the invention, showing one way to make the assembly.

FIG. 8 details the assembly of the sheath, the pipe clamps, and illustrates optional rivets 81 used to hold the pipe clamps in place on the sheath 36 during installation. The rivets extend into the sheath material, which is preferentially sheet metal of a suitable thickness.

Figure 9:
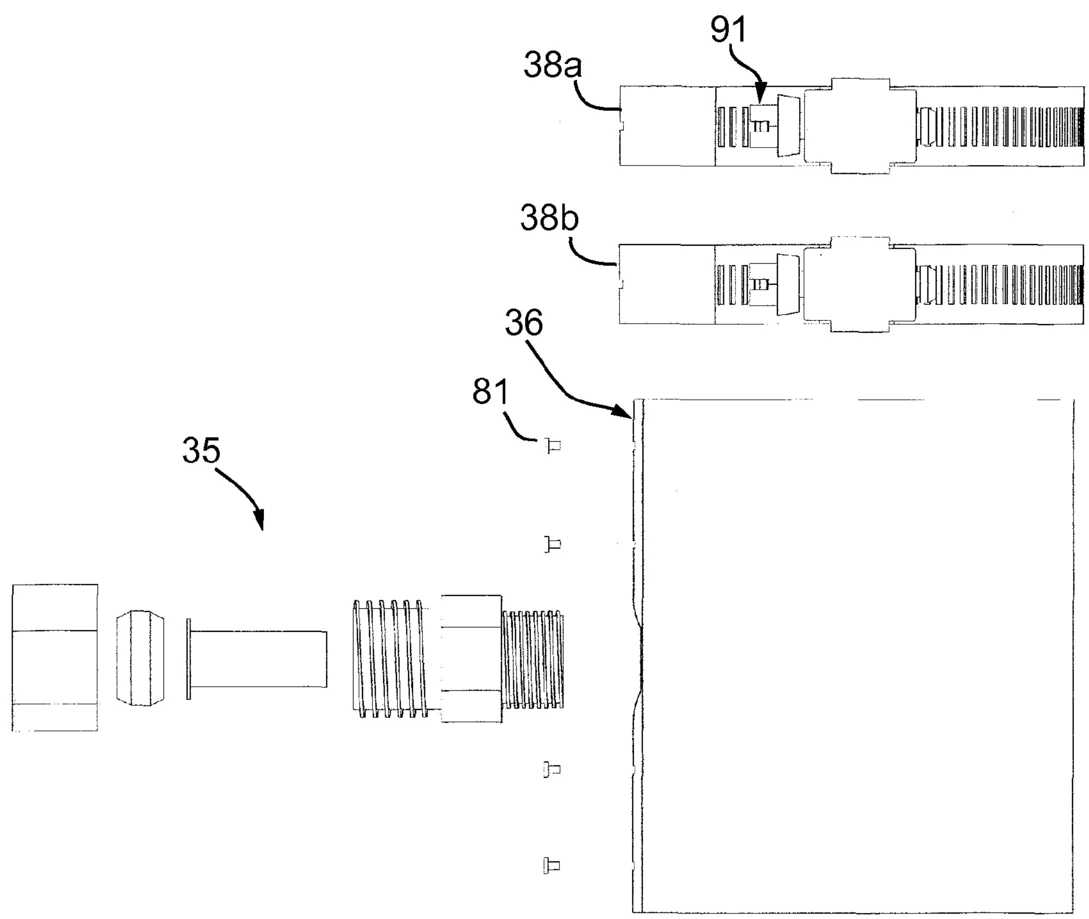
FIG. 9 details the assembly of the external sheath, the ring clamps, and rivets to hold the ring clamps in place during installation.

FIG. 9 is modified elevation view that breaks out components of a first embodiment of the invention, showing one way to make the assembly. Shown here is a sheath 36 with rivets 81, with indication of a mounting position for the external tee adaptor fitting (35, shown here in exploded view to illustrate the use of a compression nut and ferrule). Also shown are pipe clamps 37*a*, 37*b*, 38*a*, 38*b*. It can be noted that the coupling has handedness around the tee adaptor and that the two ends may be used interchangeably on standpipe and P-trap pipe ends. This is of value to a left-handed plumber, for example, who may orient the screw-heads or nuts 91 of the ring clamp tightening mechanism so that he can use his best arm when tightening the clamps. Typically the clamps are torqued to 60 pounds per square inch. This is also of value in cramped working spaces.

Figure 10:
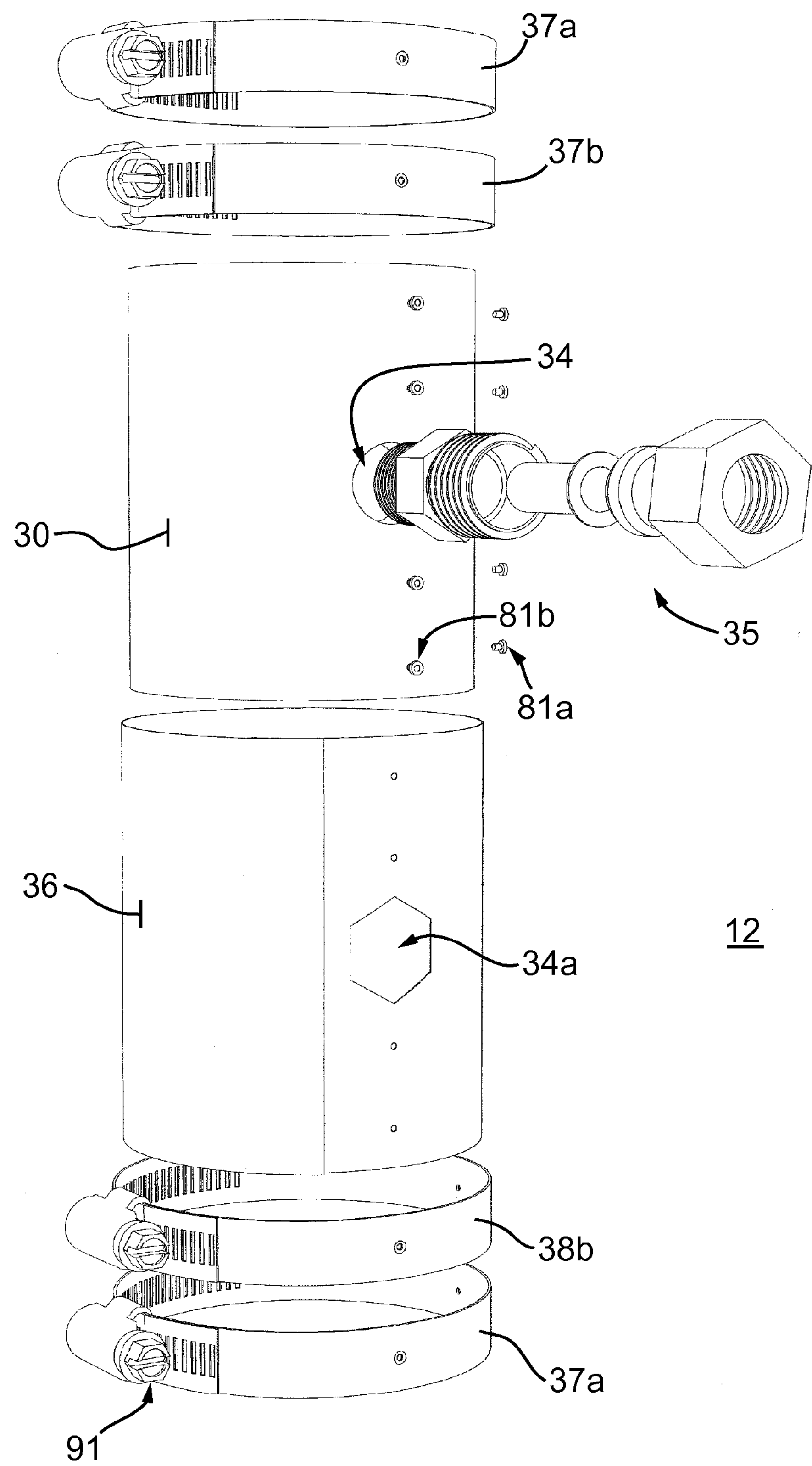
FIG. 10 is a modified exploded view, showing features of the assembly.

FIG. 10 is a modified exploded view, showing features of the assembly of the tapped pipe union. Soft gasket 30 is a full sleeve that forms the inside cylindrical wall of the pipe union, which is reinforced by cylindrical external sheath 36. A hole 34 is defined in a rigid band disposed circumferentially under the outside wall of the soft gasket 30; the hole is configured for receiving tee adaptor 35 according to the kind of adaptor used. A corresponding hole 34*a* is also made in the external sheath 36 for accommodating the tee adaptor. Pipe ring clamps (37*a*, 37*b*, 38*a*, 38*b*) are positioned around the external sheath 36 so that when snugged and tightened around a pipe a high level of rigidity and support is achieved. This does not inhibit, before final tightening, the ability to rotate the fitting so that the tee adaptor is directed where the plumber wants it for installation of the primer line. Rivets used for convenience in installing the coupling in the field include a male element 81*a* and a female element 81*b* as known in the art, but a gasket tab or an adhesive dot may be used if desired.

In other embodiments, methods are also disclosed. A first method is a method for installing a tapped no-hub pipe coupling on a sewer drain pipe having the steps of (a) providing a pipe coupling having i) a pipe union having a generally cylindrical body with circumferential inside wall and two ends, wherein the circumferential inside wall defines a center channel with centerline axis having a first end at a first opening and a second end at a second opening; and further said first opening having a first size, the first opening having a first size operable to receive a sewer drain standpipe with a first exterior diameter; and a second opening having a second size such that the second opening is operable to receive a sewer drain P-trap; ii) an elastomeric gasket sleeve liner extending from the first end to the second end; iii) a rigid band embedded within the gasket sleeve liner, wherein said rigid band is circumferentially disposed around said center channel essentially at a midpoint thereof, said rigid band having a thickness that protrudes into said center channel so as to define a first internal circumferential step facing said first end and an second internal circumferential step facing said second end; each said step being enable to rigidly support and engage a pipe butt end when seated thereon; iv) a pipe stub with a tap hole disposed in the rigid band, said tap hole and pipe stub extending laterally through the rigid band and gasket sleeve liner, wherein said pipe stub is enabled to fluidly connect said center channel to a primer line; v) an external sheath that forms an outside sleeve on said cylindrical wall; vi) at each end of said pipe union, a ring clamp mounted circumferentially around the external metal sheath; then (b) fitting said pipe coupling over a first end of a P-trap pipe section and a mated end of a standpipe pipe section so as to engage the butt ends of the pipe sections with said first and second internal circumferential steps of said center channel; (c) advantageously rotating said coupling on said centerline axis so as to aim said pipe stub when laying out a primer line to a water source; (d) then securing said coupling to said pipe section ends so that each end is rigidly supported on said internal steps after tightening said ring clamps; and (e) adjusting water flow through said primer line so that said P-trap remains full. In some instances, the "tee" is formed as an integral part of the coupling and rotates equatorially with the body; in other instances the "tee" is a fitting adapted to be placed into a tap hole formed in the rigid band so that it can be rotated with the coupling body. As commonly used, the pipes are of equal exterior diameter, and the coupling may be inserted by right-handed plumbers in one orientation and by left-handed plumbers with an opposite side up. This has the effect of orienting the tightening worm bolts on the ring clamps so as to favor the preferred arm of the plumber without limiting the plumber's ability to aim the tap hole in a preferred direction for the primer line. Alternatively, the method may be modified so that the first opening size and said second opening size are selected to be operable on different sized pipe diameters if desired.

Having described the invention with reference to the exemplary embodiments, it is to be understood that it is not intended that any limitations or elements describing the exemplary embodiments set forth herein are to be incorporated into the meanings of the patent claims unless such limitations or elements are explicitly listed in the claims. Likewise, it is to be understood that it is not necessary to meet any or all of the identified advantages or objects of the invention disclose herein in order to fall within the scope of any claims, since the invention is defined by the claims and inherent and/or unforeseen advantages of the present invention may exist even though they may not be explicitly discussed herein.

While the above is a complete description of selected embodiments of the present invention, it is possible to practice the invention use various alternatives, modifications, combinations and equivalents. In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited by the disclosure.

What is claimed is:

1. A tapped plumbing coupling and P-trap combination, which comprises:

a) a no-hub P-trap, wherein said P-trap is defined by a tubular "U" shaped body, a pipe wall, vertical and horizontal pipe ends, and an outside diameter at said ends, wherein the pipe wall is not perforated by a primer line connection adaptor;

b) a no-hub coupling with directable primer line tee adaptor, wherein said coupling comprises:

i) a straight pipe union having a tubular body;

ii) an elastomeric gasket sleeve liner extending from a first end to a second end of said tubular body; said body with circumferential inside wall and two ends, wherein the circumferential inside wall defines a center channel with centerline axis, said center channel having a first opening at said first end for receiving said vertical pipe end of said P-trap and a second pipe-receiving opening at said second end; and further wherein said sleeve liner defines a first internal circumferential step recessed from and facing said first end and a second internal circumferential step recessed from and facing said second end; each said step being configured to rigidly engage and seat a pipe butt end when received and seated thereon;

iii) a rigid band embedded within said gasket sleeve liner of said tubular body between said first internal circumferential step and said second internal circumferential step, said rigid band having a diameter, a wall having a thickness, and butt ends, wherein said rigid band is circumferentially and medially disposed in the tubular body around the center channel and each said butt ends of said rigid band are configured to support a pipe butt end seated on said steps of said elastomeric gasket sleeve liner;

iv) a tap hole extending radially through said tubular body and said rigid band;

v) an external sheath that forms a wrappable outside sleeve on said tubular body;

vi) wherein said tee adaptor is configured with a fluid connection between said center channel through said tap hole to an external primer line and is supported on said rigid band by a rigid connection thereto; and, further wherein said straight pipe union is configured to receive said vertical pipe end of said P-trap in said first end of said tubular body, and to be axially rotated thereon so as to aim said tee adaptor in any direction around the centerline axis while supported on said internal circumferential step, before rigidly and tightenedly being sealed thereonto by ring clamps mounted circumferentially around each end of said external sheath.

2. The plumbing coupling of claim 1, wherein said tee adaptor is mounted in the tap hole and disposed on said rigid band so as to protrude from said tubular body.

3. The plumbing coupling of claim 1, wherein said rigid band is a metal band, and the metal band is embedded in the gasket sleeve liner so as to not be exposed to moisture.

4. The plumbing coupling of claim 1, wherein said external sheath is a metal sleeve wrap and is perforated to accept the tee adaptor.

5. The plumbing coupling of claim 4, wherein ring clamps are disposed circumferentially proximate to said ends of said tubular body, and further wherein said ends of said coupling are interchangeable.

6. The plumbing coupling of claim 5, wherein said ring clamps are attached to the external sheath.

7. The plumbing coupling of claim 1, further comprising a primer line extending from said tee adaptor to a water source, wherein said tap hole and tee adaptor is rotatably directable on said centerline so as to minimize bends, turns and joints in said primer line.

8. The plumbing coupling of claim 1, further comprising, a cast iron standpipe section or adaptor seated in second pipe-receiving opening, said pipe section or adaptor having a compatible outside diameter g.

9. A method for installing said plumbing coupling of claim 8, which comprises:

a) fitting said first end of said coupling onto said vertical end of said P-trap and a said second end onto a standpipe pipe section so as to engage said two pipe ends with said first and second internal circumferential steps of said center channel;

b) advantageously rotating said coupling on said centerline axis so as to aim said tap hole and tee adaptor to a water source when laying out a primer line;

c) then securing said coupling to said pipe section ends so that each end is rigidly supported and sealed on said internal steps after tightening said ring clamps; and, d) adjusting water flow through the primer line so that said P-trap remains full in use.

10. A tapped plumbing coupling and P-trap combination, which comprises:

a) a no-hub P-trap, wherein said P-trap is defined by a tubular "U" shaped body, a pipe wall, vertical and horizontal pipe ends, and an outside diameter at said ends, wherein the pipe wall is not perforated by a primer line connection adaptor;

b) a no-hub coupling with directable primer line pipe stub, wherein said coupling comprises:

i) a straight pipe union having a tubular body;

ii) an elastomeric gasket sleeve liner extending from a first end to a second end of said tubular body; said body with circumferential inside wall and two ends, wherein the circumferential inside wall defines a center channel with centerline axis, said center channel having a first opening at said first end for receiving said vertical pipe end of said P-trap and a second pipe-receiving opening at said second end; and further wherein said sleeve liner defines a first internal circumferential step recessed from and facing said first end and a second internal circumferential step recessed from and facing said second end; each said step being configured to rigidly engage and seat a pipe butt end when received and seated thereon;

iii) a rigid band embedded within said gasket sleeve liner of said tubular body between said first internal circumferential step and said second internal circumferential step, said rigid band having a diameter, a wall having a thickness, and butt ends, wherein said rigid band is circumferentially and medially disposed in the tubular body around the center channel and each said butt ends of said rigid band are configured to support a pipe butt end seated on said steps of said elastomeric gasket sleeve liner;

iv) a tap hole extending radially through said tubular body and said rigid band;

v) an external sheath that forms a wrappable outside sleeve on said tubular body;

vi) wherein said pipe stub is configured with a fluid connection between said center channel through said tap hole to an external primer line and is supported on said rigid band by a rigid connection thereto; and, further wherein said straight pipe union is configured to receive said vertical pipe end of said P-trap in said first end of said tubular body, and to be axially rotated thereon so as to aim said pipe stub in any direction around said centerline axis while supported on said internal circumferential step, thereonto by ring clamps mounted circumferentially around each end of said external sheath.

11. The plumbing coupling of claim 10, wherein said pipe stub is permanently disposed on said rigid band.

12. The plumbing coupling of claim 10, wherein said rigid band is a metal band, and the metal band is embedded in the gasket sleeve liner so as to not be exposed to moisture.

13. The plumbing coupling of claim 10, wherein said pipe stub is disposed on the rigid band so as to protrude from said tubular body.

14. The plumbing coupling of claim 13, wherein said ends of said coupling are interchangeable.

15. The plumbing coupling of claim 14, wherein said ring clamps are riveted to the external sheath.

16. The plumbing coupling of claim 10, further comprising a primer line extending from said pipe stub to a water source, wherein said pipe stub is rotatably directable so as to minimize bends, turns and joints in said primer line.

17. The plumbing coupling of claim 10, further comprising a cast iron standpipe section or adaptor seated in second pipe-receiving opening, said pipe section or adaptor having a compatible outside diameter g.

18. A method for installing said plumbing coupling of claim 17, which comprises:

a) fitting said first end of said coupling onto said vertical end of said P-trap and said second end onto a standpipe pipe section so as to engage said two pipe ends with said first and second internal circumferential steps of said center channel;

b) advantageously rotating said coupling on said centerline axis so as to aim said pipe stub when laying out the primer line to a water source;

c) then securing said coupling to said pipe section ends so that each end is rigidly supported and sealed on said internal steps after tightening said ring clamps; and, d) adjusting water flow through the primer line so that said P-trap remains full in use.

19. A method of installing a tapped no-hub pipe coupling on a sewer drain pipe comprising:

a) providing a no-hub P-trap, wherein said P-trap is defined by a tubular “U” shaped body, a pipe wall, vertical and horizontal pipe ends, and an outside diameter at said ends, wherein the pipe wall is not perforated by a primer line connection adaptor;

b) providing a sewer drain standpipe pipe section;

c) providing a no-hub coupling with directable primer line pipe stub, wherein said coupling comprises:

i) a straight pipe union having a tubular body;

ii) an elastomeric gasket sleeve liner extending from a first end to a second end of said tubular body; said body with circumferential inside wall and two ends, wherein the circumferential inside wall defines a center channel with centerline axis, said center channel having a first opening at said first end for receiving said vertical pipe end of said P-trap and a second pipe-receiving opening at said second end; and further wherein said sleeve liner defines a first internal circumferential step recessed from and facing said first end and a second internal circumferential step recessed from and facing said second end; each said step being configured to rigidly engage and seat a pipe butt end when received and seated thereon, wherein said second end opening is operable to receive said sewer drain standpipe and said first end opening is operable to receive said sewer drain P-trap;

iii) a rigid band embedded within said gasket sleeve liner of said tubular body between said first internal circumferential step and said second internal circumferential step, said rigid band having a diameter, a wall having a thickness, and butt ends, wherein said rigid band is circumferentially and medially disposed in the tubular body around the center channel and each said butt ends of said rigid band are configured to support a pipe butt end seated on said steps of said elastomeric gasket sleeve liner;

iv) a tap hole extending radially through said tubular body and rigid band;

v) an external sheath that forms a wrappable outside sleeve on said tubular body;

vi) a pipe tee configured with a fluid connection between said center channel through said tap hole to an external primer line and supported on said rigid band by a rigid connection thereto;

(b) fitting said first end of said coupling over said vertical end of said P-trap pipe section and said second end over said sewer drain standpipe pipe section so as to engage the two pipe ends with said first and second internal circumferential steps of said center channel;

(c) rotating said coupling on said centerline axis so as to aim said pipe tee to a water source when laying out a primer line;

(d) then securing said coupling to each pipe section send so that each end is rigidly supported and sealed on said internal steps after tightening said ring clamps; and, (e) adjusting water flow through the primer line so that the P-trap remains full in use.

20. The method of claim 19, wherein said endwise openings of said coupling are operable to receive different sized pipe diameters.

* * * * *